Jan. 5, 1932.  H. L. CHAMBERLIN  1,840,225
APPARATUS FOR INJECTING CHLORINE GAS UNDER CONTROL
DIRECTLY INTO WATER PRESSURE MAINS
Filed May 8, 1929  2 Sheets-Sheet 2
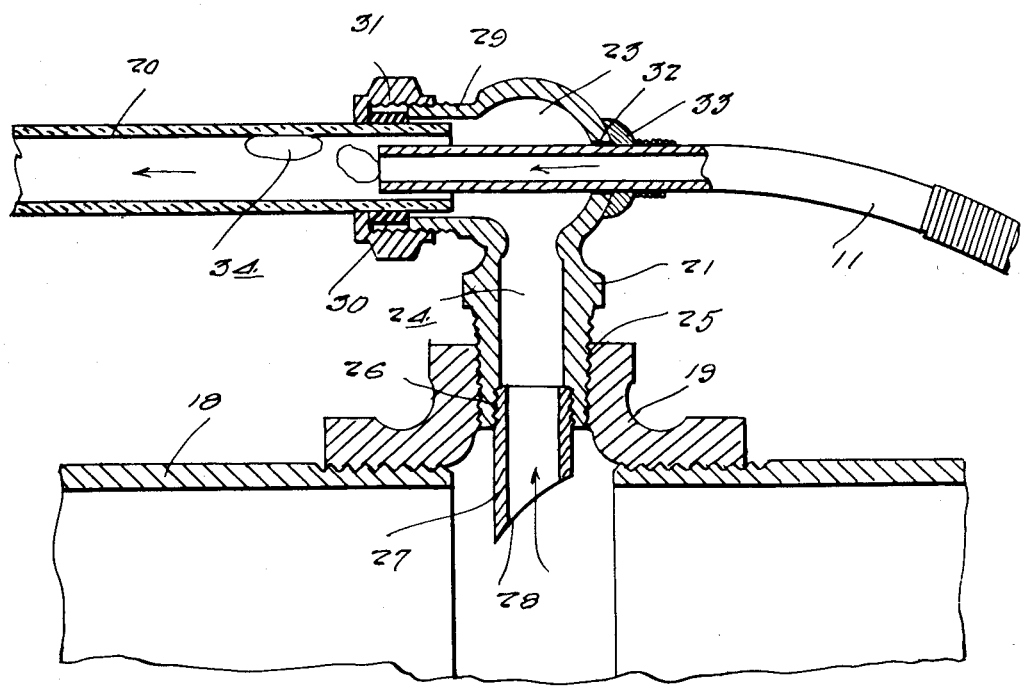
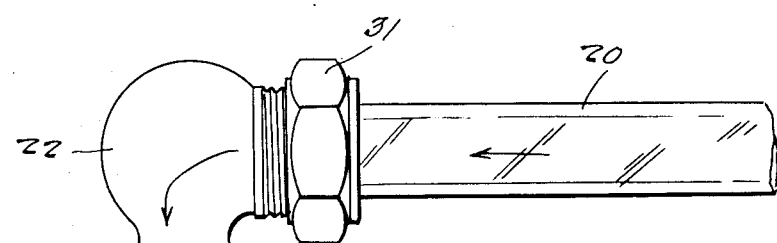
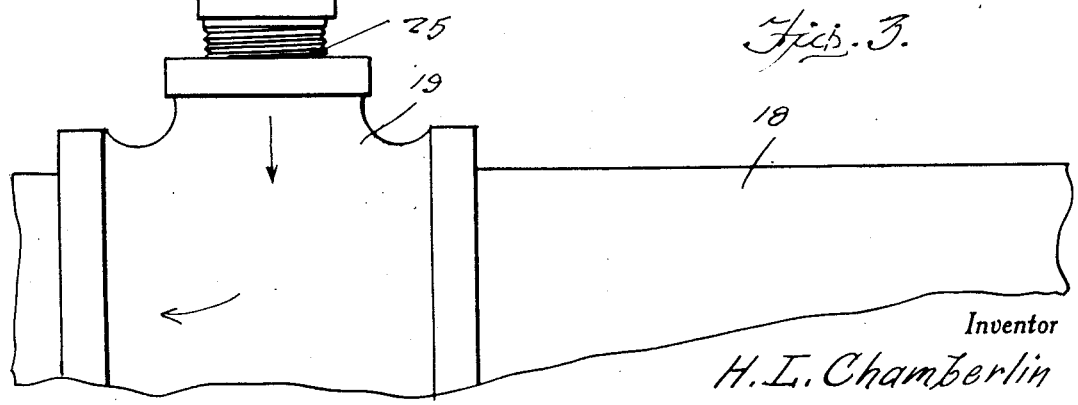
Inventor
H. L. Chamberlin
By Clarence A. O'Brien
Attorney Patented Jan. 5, 1932

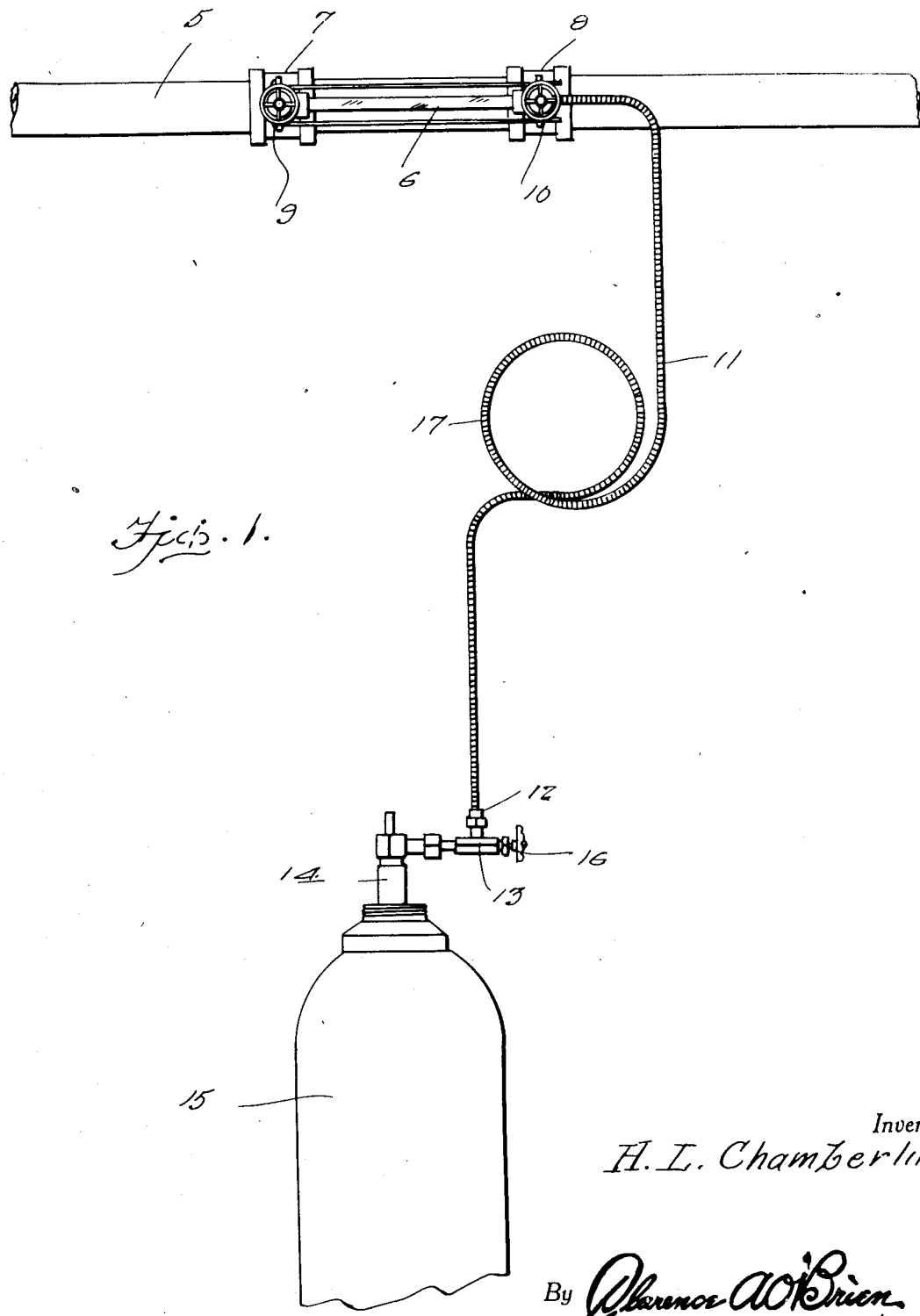

1,840,225

UNITED STATES PATENT OFFICE

HARRY L. CHAMBERLIN, OF LANSING, MICHIGAN

APPARATUS FOR INJECTING CHLORINE GAS UNDER CONTROL DIRECTLY INTO WATER PRESSURE MAINS

Application filed May 8, 1929. Serial No. 361,352.

This invention pertains to a method of injecting chlorine gas under control directly into water pressure mains and has as its primary object the provision of means whereby the chlorine gas may be injected into the water pressure main through the medium of a water gage tube carried by the water main.

Another very important object of the invention is the provision of means whereby the deteriorating effect of the chlorine gas upon the pipe fitting may be overcome by the cooperation of the fluid passing through the main.

Another very important object of the invention is the improvement of the chlorine gas conduit, together with novel and advantageous means of assembling the conduit with the water glass of the water main.

Other objects and advantages of the invention will become apparent during the study of the following description taken in connection with the accompanying drawings, wherein:

Figure 1 is a plan view of a water main having a water gauge associated therewith and illustrating the application of my invention.

Figure 2 is a fragmentary detail sectional view taken through one end of a modified form of my invention.

Figure 3 is a fragmentary side elevation of the other end of a modified form of my invention as illustrated in Figure 2.

With reference more in detail to the drawings, and more particularly to Figure 1, it will be seen that the reference character 5 designates a water main of the usual construction, and provided with the glass water gauge 6 associated with the main by suitable fittings 7 and 8 respectively and having the usual hand control valves 9 and 10 respectively interposed between the circulating water main and the gauge glass fitting at opposite ends of the glass all in the usual manner.

One end of an especially constructed gas conduit 11 extends through the chamber of the gauge glass fitting 8 and the opposite end of the conduit 11 is associated as at 12 to a valve casing 13, suitably associated with the discharge end 14 of a chlorine gas container 15. It is to be understood that the chlorine gas valve 16 is of the manual control type, whereby the amount of chlorine gas to be conducted to the water main may be manually controlled. The chlorine gas conduit is preferably in the form of a lead pipe wound on its outer face with wire, as illustrated, and the pipe is, of course, of sufficient strength to withstand the pressure of the chlorine and further to withstand the action of the wet chlorine gas which forms on the inside of the pipe a thin film of insoluble lead chloride. The conduit 11 is looped as at 17 between the point of supply and point of injection of the chlorine gas and this loop acts as a syphon to prevent the chlorine charged water, at all times from working back to the non-automatic chlorine valve 16, since it is obvious that if the chlorine charged water were permitted to work back to the valve 16, corrosion of the metal of the valve fitting 8 would take place.

Attention is now directed to Figures 2 and 3, wherein is illustrated the modified form of my invention, and a description of which will give a more clear knowledge of my invention. In Figures 2 and 3, I designate the water main by the reference character 18 and it is to be understood, of course, that this water main 18 is the same in form and construction as the main illustrated in Figure 1 of the drawings. The main 18 is likewise provided with the fittings 19 whereby a glass water gauge 20 may be suitably secured thereto. However, in the herein discussed embodiment of the invention, the water glass 20 at opposite ends projects into and is secured therein to suitable fittings 21 and 22 respectively. The fittings 21 and 22 are identical in construction and therefore a detailed description of one is deemed sufficient for a clear understanding of the invention. For example, the fitting 21 is in the form of a metal casting so formed as to provide a chamber 23 and an inlet 24 for the chamber, which inlet 24 communicates with the interior of the main 18 when the fitting is screw threadedly associated with the fitting 19 as at 25.

Screw threadedly associated with the inlet 24 of the casting, as at 26, is a nipple 27, which nipple has its bevelled end 28 projecting into the water main. One end of the glass water gauge 20 extends into the casting 21 as at 29 to communicate with the chamber 23 formed within the casting. The joint between the said one end of the gauge glass and the casting at 21 is made water-tight by means of the customary rubber gaskets 30 and the screw fitted gland 31. Each of the castings 21 and 22 are lead lined to prevent corrosion of the casting by the chlorine gas water solution. The casting 21 differs from the casting 22 in the following respects.

The casting 21 has the wall of the chamber provided with an opening 32, whereby the discharge end of the conduit 11 is received into the fitting and extends through the chamber 23 to project inwardly of the proximate end of the water glass gauge 20 as illustrated. The conduit 11 is joined to the fitting 21 adjacent the opening 22 by means of a soldered joint 33.

When the chlorine gas is conducted from the container to the conduit 11 into the gauge 20, the gas upon discharging from the conduit 11 issues therefrom in bubbles as designated at 34 and strikes the upper surface of the gauge glass 20 as illustrated and is then carried along through the glass by the circulating water under pressure which is introduced into the gauge glass from the circulating water main 18 to the bevelled projecting nipple 27 and fitting 21 to return to the circulating water main through the casting 22.

The chlorine gas so admitted into the gauge 20 as before described is gradually absorbed by the circulating water. Thus the gauge glass becomes an instrument of sight feed by which the chlorine gas may be closely regulated from less than one-tenth part of chlorine per million parts of water upto any predetermined quantity required for sterilizing the water.

While I have herein shown and described somewhat in detail the operation of my device with regard to the modified form shown in Figures 2 and 3, it is of course to be understood that the same reaction between the water and chlorine takes place when used with a water main having the glass gage 6 associated therewith together with the valve means 9 and 10 interposed between the circulating water main and the gauge glass fitting.

From the foregoing then, it will be seen that I have provided an improved means whereby chlorine gas may be conveyed through the gauge glass associated with a water main for sterilizing the water as it passes through the main and gauge.

While I have herein shown and described the preferred embodiments of my invention, it is to be understood that the invention as herein described and illustrated is susceptible of various changes fully comprehended by the spirit of the invention as described and the scope of the appended claims.

What is claimed is:

1. In combination, a water main, a gauge glass for the main, a chlorine gas container, and a gas conduit leading from the container and adapted to extend into the gauge glass.

2. In combination, a water main, a gauge glass for the main, a chlorine gas container, and a gas conduit leading from the container and adapted to extend into the gauge glass, said conduit embodying a wire wound reinforced lead pipe.

3. In combination, a water main, a gauge glass for the main, a pair of hollow castings communicating with the interior of the main, each of said castings adapted to receive one end of the glass gauge, a gas conduit extending through one of the said castings and terminating inwardly of the gauge glass, and means associated with the conduit for injecting chlorine gas into the gauge glass to intermingle with the contents of the gauge.

4. In combination, a water main, a gauge glass for the main, a pair of hollow castings communicating with the interior of the main, each of said castings receiving one end of the water glass gauge, a gas conduit leading into one of the castings and terminating within one end of the gauge glass, manually operated valve control means associated with the conduit, and said conduit being provided with a single loop adapted to trap the chlorine charged water all in the manner and for the purpose set forth.

In testimony whereof I affix my signature.

HARRY L. CHAMBERLIN.